United States Patent [19]

Kühn

[11] Patent Number: 5,788,856
[45] Date of Patent: Aug. 4, 1998

[54] PROCESS FOR FABRICATING MULTISEGMENT RIDGE WAVEGUIDES

[75] Inventor: Edgar Kühn, Stuttgart, Germany

[73] Assignee: Alcatel NV, Netherlands

[21] Appl. No.: 591,151

[22] Filed: Jan. 25, 1996

[30] Foreign Application Priority Data

Jan. 28, 1995 [DE] Germany ............ 195 02 684.5

[51] Int. Cl.⁶ ................................................ G02B 6/12
[52] U.S. Cl. ................ 216/24; 437/129; 385/130; 216/40
[58] Field of Search .................. 216/2, 24, 40; 156/649.1; 437/129, 228, 924, 984; 385/14, 130, 131

[56] References Cited

U.S. PATENT DOCUMENTS

| | | | |
|---|---|---|---|
| 4,359,260 | 11/1982 | Reinhart et al. | 385/130 |
| 4,805,184 | 2/1989 | Fiddyment et al. | 385/130 |
| 4,895,615 | 1/1990 | Muschke | 156/643.1 |
| 5,105,433 | 4/1992 | Eisele et al. | 385/130 |
| 5,125,065 | 6/1992 | Stoll et al. | 385/130 |
| 5,579,424 | 11/1996 | Schneider | 216/24 |

FOREIGN PATENT DOCUMENTS

| | | |
|---|---|---|
| 0230118 | 7/1987 | European Pat. Off. . |
| 0526023 | 2/1993 | European Pat. Off. . |
| 2-187705A | 7/1990 | Japan ............ 385/130 |

*Primary Examiner*—R. Bruce Breneman
*Assistant Examiner*—Anita Alanko
*Attorney, Agent, or Firm*—Ware, Fressola, Van Der Sluys & Adolphson LLP

[57] ABSTRACT

A process for fabricating multisegment ridge waveguides is disclosed which is self-aligning and avoids unnecessary masking and etching steps. The process essentially comprises five steps: removing, in a starting layer structure, a top layer (DS) on both sides of areas where segment transitions (ST) are to be formed; depositing a metal contact layer (KM); etching a desired ridge-waveguide structure (R); covering the entire area except the segment transition areas with photoresist; and removing the contact layer (KM) in the segment transition areas by a lift-off step, thus providing electrical separation between the individual segments.

2 Claims, 2 Drawing Sheets

PROCESS FOR FABRICATING MULTISEGMENT RIDGE WAVEGUIDES

TECHNICAL FIELD

The present invention relates to a process for fabricating multisegment optical ridge-waveguide structures from a semiconductor layer structure grown on a substrate, the ridge-waveguide structures being provided with metal contacts which are associated with the respective waveguide segments and are electrically separated from each other, the upper layer of the semiconductor layer structure, the top layer supporting the metal contacts, being etchable by a wet chemical process.

BACKGROUND OF THE INVENTION

With such a process, segmented optical waveguides can be fabricated whose segments can be electrically controlled or interrogated for their state via separate metallic contacts.

The segments of such optical waveguides can be operated and used, e.g., in optical communications, as lasers, optical amplifiers, optical modulators, absorbers, wavelength converters, or as passive components, which do not provide light amplification.

Since the dimensions of such components are very small, utmost precision is required during their fabrication. Holding tolerances in the µm range is so complicated that alignment-changing processing steps, such as further alignment or masking steps or processing-tool changing during fabrication, cannot be introduced without increasing the fabrication costs to a prohibitive level. It is therefore desirable to find a process in which no changes in tool geometry are necessary during fabrication and in which as many processing steps as possible are self-aligning steps. This is the object of the invention. It is attained by the process wherein the following steps are carried out one after the other; removing the top layer in narrow areas on both sides of segment transition areas in which electrical separation is to be provided between metal contacts of adjoining waveguide segments; depositing a metal layer where waveguide structures are to be formed, disregarding segment boundaries and segment transition areas; etching waveguide-forming ridge structures from the semiconductor layer-structure using the metal layers as an etch mask; covering the entire patterned semiconductor layer structure except segment transition areas with a layer resistant to etchants used to etch the top layer; and etching the top layer in segment transition areas and, thus, undercutting and removing the metal layer in said areas.

With the process according to the invention, laterally very small structures (in the µm range) can be formed without the need for a special etching step to separate the metallization between adjoining segments. This, like the etching of the ridge waveguide, is done in a self-aligning process step (lift-off technique). This eliminates the need for masking steps, which would require high alignment accuracy and thus entail great expense.

A further development of the process according to the invention is to deposit the metal layer, wherein the following steps are carried out: depositing a photoresist layer, exposing the entire photoresist layer, and, after a temperature step, exposing said photoresist layer through a shadow mask imaging the waveguide pattern; developing the photoresist layer and stripping the layer in the exposed area; metallizing the semiconductor layer structure by evaporation; and stripping the remaining portions of the photoresist layer together with evaporated metal portions.

BRIEF DESCRIPTION OF THE DRAWING

The process according to the invention will now be described in detail with reference to the accompanying drawings, in which.

BEST MODE FOR CARRYING OUT THE INVENTION

Figure 1:
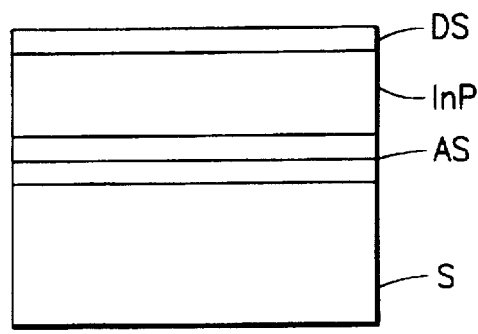
FIG. 1 shows a semiconductor layer structure on a substrate.

FIG. 1 shows a conventional semiconductor layer structure which can serve as starting material for the fabrication of active and passive optical waveguides. On a substrate S, e.g., an InP layer, further semiconductor layers have been grown, including a group of layers AS, which comprises an active layer, for example, over which a further InP layer InP and finally a top layer DS of, e.g., heavily doped InGaAs are provided, the top layer DS being only approximately 0.3 µm thick and etchable by a wet chemical process.

If a segmented optical ridge waveguide with separate metal contacts on the individual segments is to be formed on a semiconductor chip containing the layer structure of FIG. 1, the top layer is removed on both sides of segment transition areas. This can be done by dry etching, for example.

Figure 2:
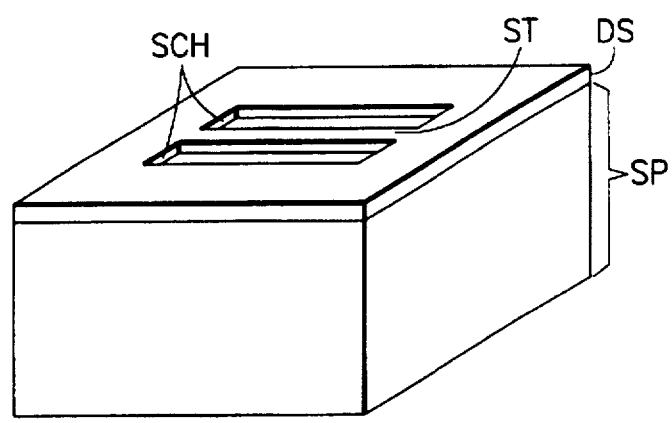
FIGS. 2 to 5 show the layer structure and the formation of the optical waveguide by the first, second, third, and last process steps.

FIG. 2 shows a semiconductor chip—illustrated only as a group of layers SP with the overlying top layer DS to simplify the illustration—whose top layer has two slots, SCH, on both sides of an area which will later form a segment transition area ST.

Figure 3:
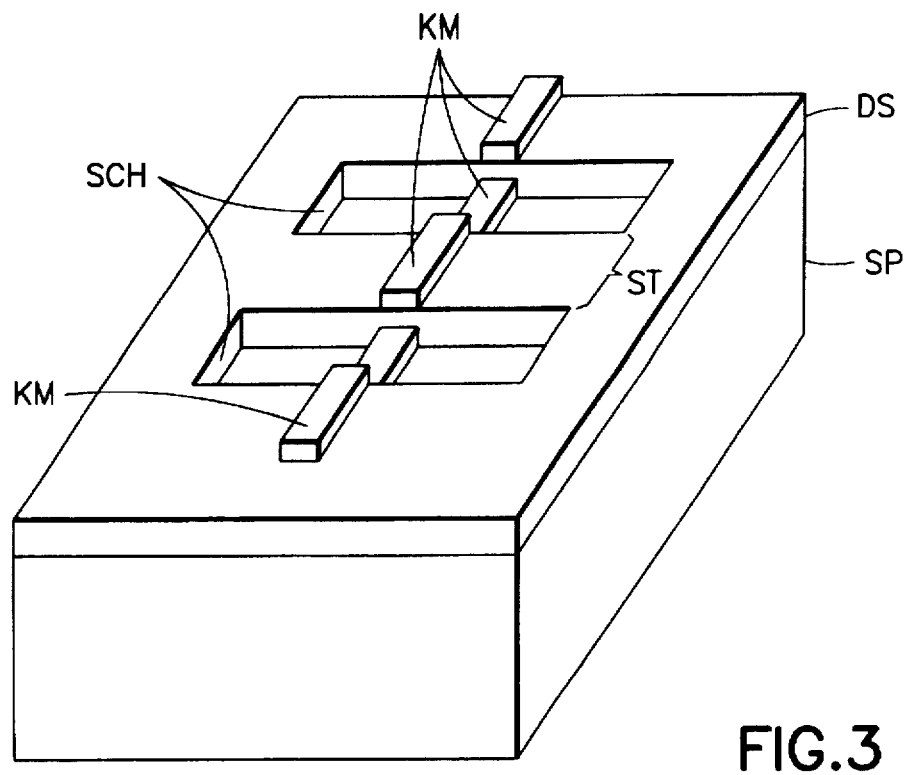

FIG. 3 shows the same semiconductor chip with a contact metallization KM deposited thereon. Here a metal stripe only few µ wide was formed on the chip surface, disregarding the slots in the top layer. The figure clearly shows that in the area of the slot walls, the metallization is interrupted or at least clearly reduced in thickness.

The contact metallization can be formed in any conventional manner, such as by depositing a photoresist layer which is exposed through a shadow mask covering the area of the contact metallization, then developed, coated with metal by a vapor deposition process, and finally stripped, with the metal on the top layer being not removed in the area of the stripe covered by the shadow mask.

Figure 4:
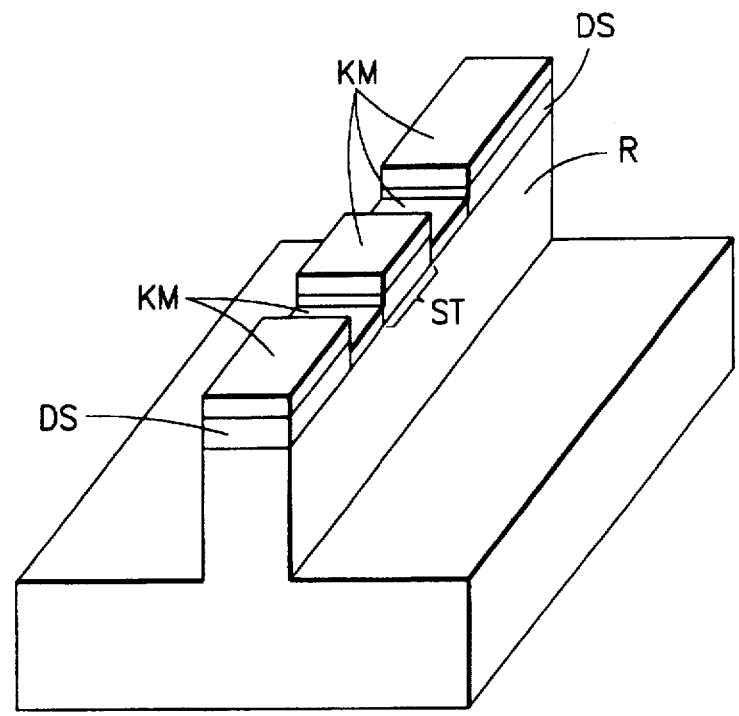

FIG. 4 shows the semiconductor chip after a ridge structure R has been etched out below the contact metallization by a dry chemical etching process, such as RIE, IBE, or RIBE. In such processes, the metal coating can serve as a mask, thus eliminating the need for a special masking step.

Figure 5:
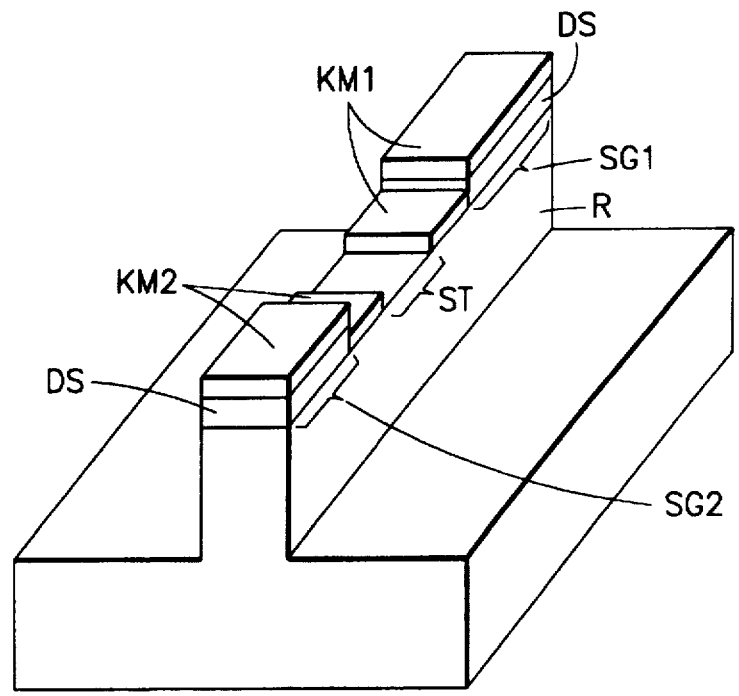

FIG. 5 shows the semiconductor chip with metal contacts KM1, KM2 which are electrically separated from each other. The separated contacts divide the ridge waveguide R into two individually controllable segments SG1, SG2. The segment transition area no longer contains a metallization. This was achieved in two steps. First, the entire chip except the segment transition area was covered with photoresist in the same way as described in connection with FIG. 3 for the area of the contact metallization. Then, the top layer still present in the segment transition area was etched away by a wet chemical process, the metallization in the segment transition area being removed by undercutting.

I claim:

1. A process for fabricating multisegment optical ridge-waveguide structures (R) from a semiconductor layer structure grown on a substrate (S), the ridge-waveguide structures (R) being provided with metal contacts (KM1, KM2) which are associated with the respective waveguide segments (SG1, SG2) and are electrically separated from each other, the upper layer of the semiconductor layer structure, i.e., the top layer (DS) supporting the metal contacts, being etchable by a wet chemical process, characterized in that after formation of the semiconductor layer structure, including the top layer (DS), the following steps are carried out one after the other:

removing the top layer to form slots in areas (SCH) on both sides of segment transition areas (ST) in which electrical separation is to be provided between metal contacts of adjoining waveguide segments (SG1, SG2);

depositing a metal layer (KM) where waveguide structures (R) are to be formed, disregarding segment boundaries and segment transition areas (ST);

etching waveguide-forming ridge structures (R) from the semiconductor layer structure using the metal layer as an etch mask;

covering the entire patterned semiconductor layer structure except segment transition areas with a layer resistant to etchants used to etch the top layer; and etching the top layer (DS) in segment transition areas and, thus, undercutting and removing the metal layer in said areas.

2. A process as claimed in claim 1, characterized in that to deposit the metal layer, the following steps are carried out:

depositing a photoresist layer, exposing the entire photoresist layer, and, after a temperature step, exposing said photoresist layer through a shadow mask imaging the waveguide pattern;

developing the photoresist layer and stripping the photoresist layer in the exposed area;

metallizing the semiconductor layer structure by evaporation; and stripping the remaining portions of the photoresist layer together with evaporated metal portions.

* * * * *